United States Patent
Orr

(10) Patent No.: US 6,754,338 B1
(45) Date of Patent: Jun. 22, 2004

(54) BIDIRECTIONAL LOSS/SLOPE EQUALIZER ARRANGEMENT

(75) Inventor: Bruce Francis Orr, Balgowlah (AU)

(73) Assignee: Alcatel, Paris (FR)

( * ) Notice: Subject to any disclaimer, the term of this patent is extended or adjusted under 35 U.S.C. 154(b) by 744 days.

(21) Appl. No.: 09/597,082

(22) Filed: Jun. 20, 2000

(30) Foreign Application Priority Data

Jun. 25, 1999 (AU) .......................................... 36814/99

(51) Int. Cl.$^7$ .............................................. H04M 7/04
(52) U.S. Cl. .............. 379/398; 379/93.05; 379/399.01; 379/394; 330/195
(58) Field of Search ................................ 379/398, 394, 379/93.05; 330/195

(56) References Cited

U.S. PATENT DOCUMENTS

| 3,818,151 A | 6/1974 | Chambers, Jr. et al. ..... 379/347 |
| 5,623,543 A | * 4/1997 | Cook ........................ 379/402 |

FOREIGN PATENT DOCUMENTS

JP    57 176 895 A    10/1982

* cited by examiner

Primary Examiner—Minsun Oh Harvey
Assistant Examiner—Walter F. Briney, III
(74) Attorney, Agent, or Firm—Sughrue Mion, PLLC

(57) ABSTRACT

A bidirectional equalizer arrangement for cancelling the effect of residual capacitance and/or residual resistive loss in a separation filter having a low-pass filter and a high-pass filter. The equalizer comprises a differential amplifier whose input forms the equalizer's connection terminals, and whose output is coupled, via a transformer, to a positive feedback circuit that includes the transformer's secondary winding, a capacitor and a resistor of predetermined values. When the equalizer is operatively coupled to the low-pass filter, the positive feedback circuit produces a feedback current of opposite polarity and equal magnitude to that produced by the residual capacitance and/or the residual resistive loss, thereby substantially cancelling their effect. The equalizer may be advantageously used with an ADSL/POTS separation filter.

10 Claims, 3 Drawing Sheets

this invention relates to a filter arrangement for telephone lines…

BIDIRECTIONAL LOSS/SLOPE EQUALIZER ARRANGEMENT

BACKGROUND OF THE INVENTION

This invention relates to a filter arrangement for telephone lines, and in particular to a filter arrangement for separating signals of an analogue telephone service, otherwise known as a plain old telephone service (POTS), and very high-rate digital signals using Digital Subscriber Line technology, such as, for example, Asymmetric Digital Subscriber Line (ADSL) technology, that are both transmitted over a single twisted pair telephone line. Such a filter arrangement is known as an ADSL/POTS separation filter.

An ADSL/POTS separation filter separates a subscriber loop into a first transmission path that includes a respective low-pass filter arrangement at the exchange and at the subscriber end to accommodate a low- frequency POTS band, typically 200 Hz to 3400 Hz, and a second transmission path that includes a high-pass filter arrangement incorporated respectively in a line terminal (LT) unit at the exchange and in a network terminal (NT) unit at the subscriber end, to accommodate a predetermined band above the POTS band.

The low-pass filter arrangement typically has a residual loss and/or frequency response slope in the POTS band. This loss may be as high as several dB and is not acceptable to some network operators. The effective capacitance of the LT unit and the NT unit (including the high-pass filter arrangements) which bridge the line may cause significant frequency response slope. There is also loss due to winding resistance of inductors used in the low-pass filters, even in the case of "active" filters.

SUMMARY OF THE INVENTION

It is an object of the present invention to provide a bidirectional equalizer arrangement to substantially cancel the loss in the POTS band in a both directions of transmission through the low-pass filter.

According to the invention there is provided a bidirectional equalizer arrangement for cancelling, in a filter means, the effect of residual capacitive and/or residual resistive loss associated with said filter means, said arrangement comprising a differential amplifier means whose input means is coupled to terminal means and whose output is operatively coupled to a primary winding of a transformer means for producing in said transformer means' secondary winding a voltage of predetermined magnitude and polarity, said secondary winding forming part of a positive feedback circuit coupled to said terminal means, said feedback circuit including a capacitor means of predetermined value and/or resistor means of predetermined value, for producing a feedback current of opposite polarity and equal magnitude, to substantially cancel the effect of said residual capacitance and/or residual resistive loss of said filter means when said filter means is operatively coupled to said terminal means of said equalizer arrangement.

BRIEF DESCRIPTION OF THE DRAWINGS

In order that the invention may be readily carried into effect, an embodiment thereof will now be described in relation to the accompanying drawings, in which.

DETAILED DESCRIPTION OF THE INVENTION

Figure 1:
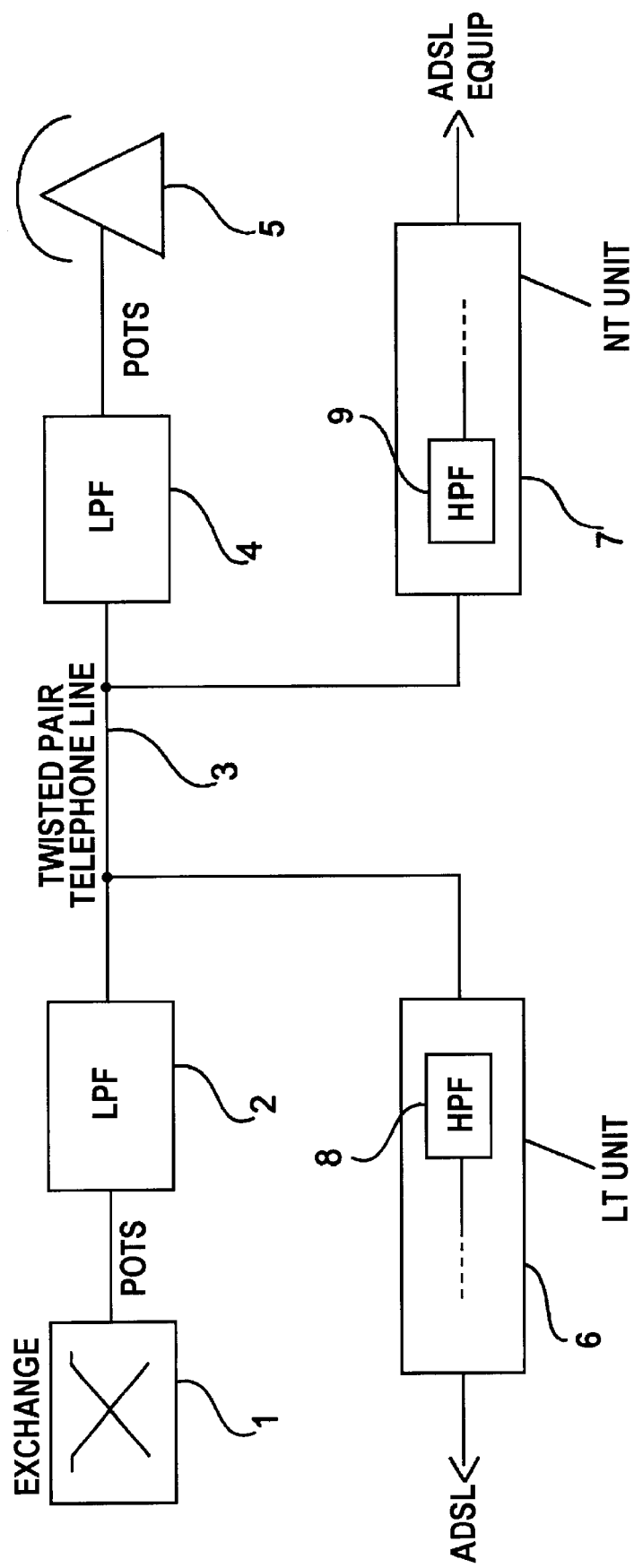
FIG. 1 shows a block schematic of an ADSL transmission system.

Referring to FIG. 1, the ADSL transmission system comprises a POTS transmission path and an ADSL digital transmission path, each path utilising a common twisted pair telephone line. The POTS transmission path comprises exchange line equipment 1, a first low-pass filter 2, telephone line 3, a second low-pass-filter 4 and a subscriber telephone instrument 5.

The ADSL digital path comprises an LT unit 6 at the exchange end, telephone line 3 and an NT unit 7 at the subscriber telephone end; the LT unit and the NT unit each incorporate a high-pass filter 8,9. Low-pass filters 2,4 incorporate impedance filter means (see FIG. 1) having one or more inductors.

Figure 2:
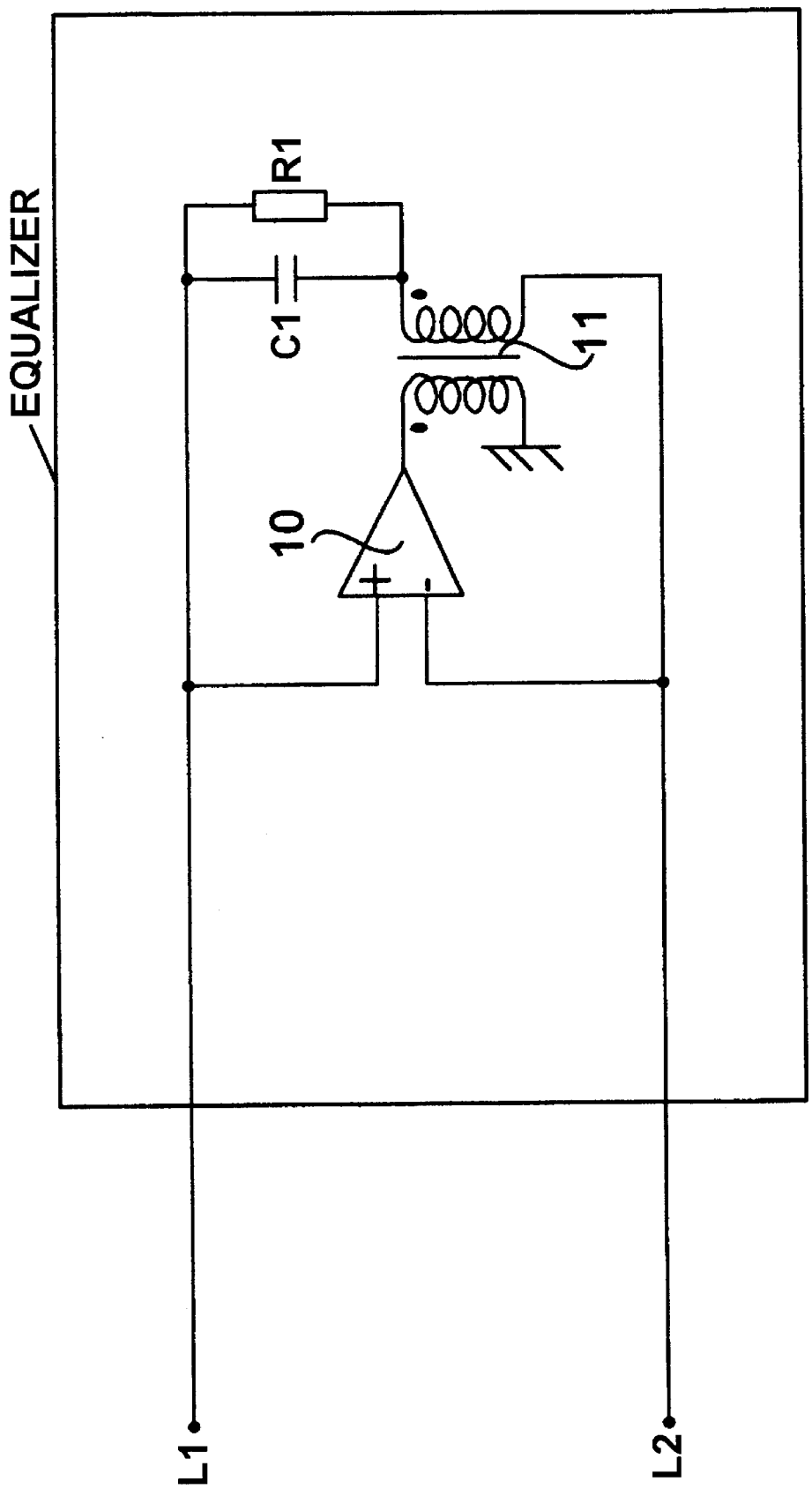
FIG. 2 shows a circuit of the bidirectional equalizer of the present invention.

Referring to FIG. 2, the bidirectional equalizer comprises a differential amplifier 10 whose input is connected to the equalizer's terminals L1 and L2, and whose output is coupled to the primary winding of an isolating transformer 11. The secondary winding of transformer 11 is coupled to terminals L1 and L2 via a serially connected RC network consisting of capacitor C1 and resistor R1. Typically, the value of capacitor C1 is 27 nF, and the value of resistor R1 is 10K ohms. In some implementations resistor R1 can be omitted.

Figure 3:
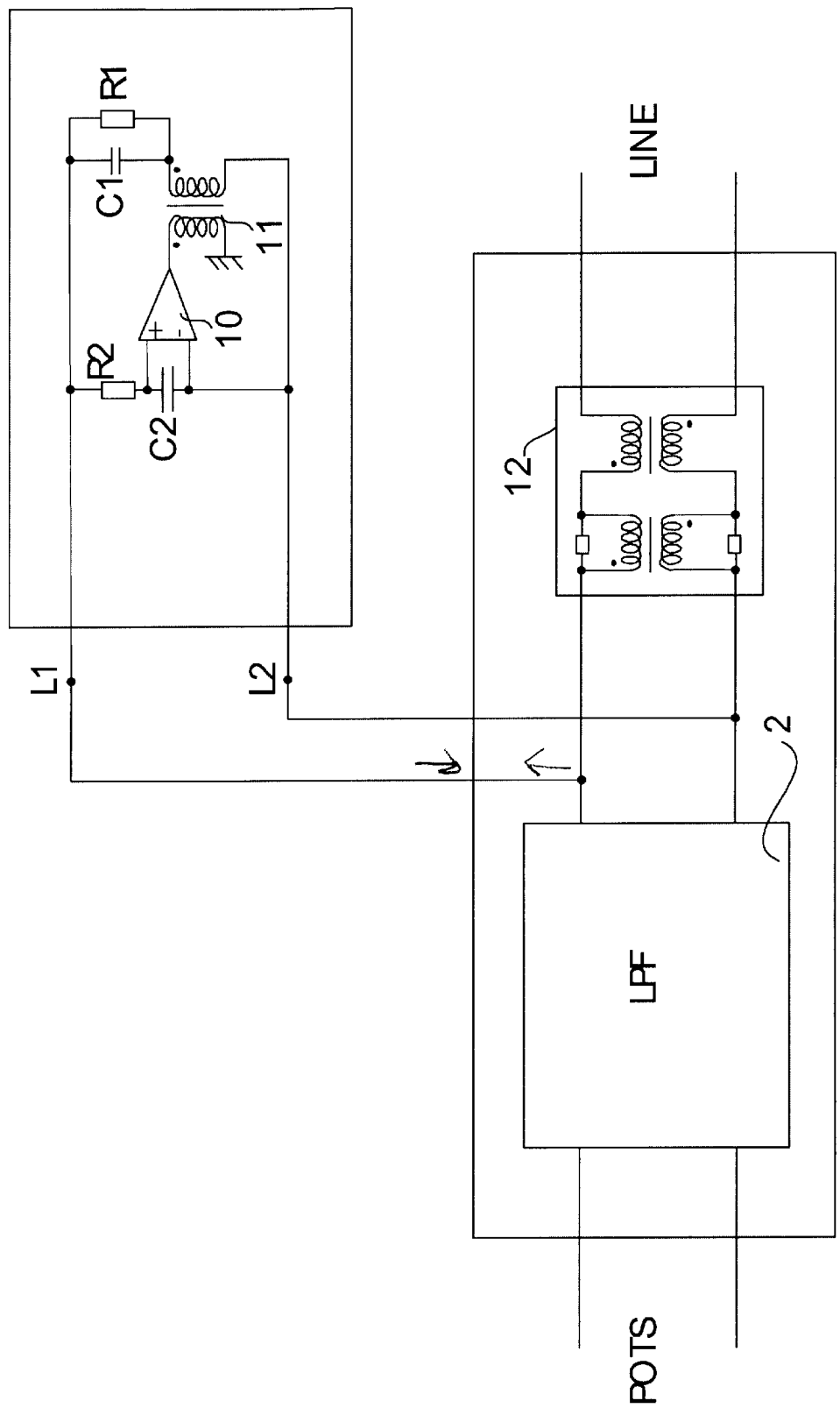
FIG. 3 shows the bidirectional equalizer of FIG. 2 operatively associated with the low-pass filter at the exchange end of the transmission system of FIG. 1.

Referring to FIG. 3, the terminals L1 and L2 of the equalizer are preferably connected behind the impedance filter inductors 12 of the low-pass filter to ensure a high impedance at the line in the ADSL frequency band and to limit the effect of high frequency ADSL signals on the operation of the equalizer. An equalizer may be connected to each of low-pass filters 2 and 4, or connected to one or the other.

In operation, differential amplifier 10 senses the line to line voltage across L1 and L2 and produces a buffered output suitable for driving the isolating transformer 11. The secondary winding of transformer 11, together with capacitor C1 and resistor R1 of predetermined values, form a positive feedback circuit. Preferably, gain of the differential amplifier and transformer combination is two. With this gain value capacitor C1 produces an effective negative capacitance of the same value as the residual capacitance of the LT/NT units by producing a current whose magnitude is equal to the magnitude of current flowing through the residual capacitance, and the polarity of the current produced by the feedback circuit is opposite to the polarity of the current flowing through the residual capacitance, thereby cancelling the effect of the residual capacitance. Similarly, resistor R1 produces an effective negative resistance of the same value as residual loss in the low-pass filter.

Preferably, to optimise performance, a simple R/C low-pass filter stage may be added either before or after differential amplifier 10 to roll off feedback gain above the POTS band. Such a low-pass filter is shown in FIG. 3, comprising resistor R2 and capacitor C2 arranged at the input of differential amplifier 10.

The equalizer of the present invention typically achieves a loss of less than 0.3 dB across the POTS band of 200 Hz to 3400 Hz. Further, return loss as measured at the POTS line port is improved.

The claims defining the invention are as follows:

1. A bidirectional equalizer arrangement for cancelling, in a filter, the effect of residual capacitive and/or residual resistive loss associated with said filter, said arrangement comprising:

a first terminal and a second terminal, configured to connect the bidirectional equalizer arrangement to the filter;

a transformer, having a primary winding and a secondary winding;

a differential amplifier, having a first input coupled to said first terminal, having a second input coupled to said second terminal, and whose output is operatively coupled to the primary winding of said transformer, thereby producing in said transformer's secondary winding a voltage of predetermined magnitude and polarity, a positive feedback circuit coupled to said first terminal and said second terminal, said feedback circuit including:

said secondary winding; and a capacitance of predetermined value and/or resistance of predetermined value, wherein said secondary winding is coupled to said first terminal and said second terminal via the capacitance and/or resistance, and wherein said positive feedback circuit produces a feedback current of opposite polarity and equal magnitude to that produced by the residual capacitive and/or residual resistive loss, to substantially cancel the effect of said residual capacitive and/or residual resistive loss of said filter when said filter is operatively coupled to said first terminal and said second terminal of said equalizer arrangement.

2. A bidirectional equalizer arrangement as claimed in claim 1, wherein gain produced by said differential amplifier and said transformer is two.

3. A bidirectional equalizer arrangement as claimed in claim 1, wherein said capacitance and said resistance are arranged in a parallel circuit which is serially connected with said secondary winding in said feedback circuit between said first terminal and said second terminal.

4. A bidirectional equalizer arrangement as claimed in claim 1, wherein said filter is a low-pass filter which, together with a high-pass filter, form at least part of a separation filter to separate two frequency bands transmitted over a common bearer, said residual capacitive loss residing in said high-pass filter, and said low-pass filter being operatively coupled to said first terminal and said second terminal of said equalizer arrangement.

5. A bidirectional equalizer arrangement as claimed in claim 4, wherein said separation filter is an ADSL/POTS separation filter operatively located at respective terminal ends, or at one terminal end of an ADSL transmission system.

6. A bidirectional filter arrangement as claimed in claim 5, wherein said arrangement includes a low-pass filter stage operatively associated with said differential amplifier and arranged to roll off feedback gain above a predetermined frequency band.

7. A bidirectional filter arrangement as claimed in claim 6, wherein said low-pass filter stage comprises resistance and capacitance operatively arranged at the input of the differential amplifier.

8. An ADSL transmission system incorporating at least one bidirectional equalizer arrangement as claimed in claim 1.

9. A bidirectional equalizer arrangement for cancelling, in a filter, residual capacitive and/or residual resistive current losses associated with said filter, said bidirectional equalizer arrangement comprising:

a first terminal and a second terminal, configured to connect the bidirectional equalizer arrangement to said filter, wherein there is a first voltage across said first terminal and said second terminal when said filter is operatively coupled to said bidirectional equalizer arrangement;

means for sensing the first voltage, outputting a second voltage based on the sensed first voltage;

means for feeding back a current of opposite polarity and equal magnitude to the current losses associated with said filter, substantially cancelling an effect of said residual capacitive and/or residual resistive loss of said filter when said filter is operatively coupled to said first terminal and said second terminal of said bidirectional equalizer arrangement, said means for feeding back being coupled to said first terminal and said second terminal, and including:

means for producing an effective negative capacitance and/or resistance of a same value as the residual capacitive and/or residual resistive loss associated with said filter; and means for providing a third voltage based on the second voltage to said means for feeding back, while isolating output from said means for sensing from said means for feeding back, wherein said means for providing the third voltage comprises a primary winding of an isolating transformer, the second voltage being applied to the primary winding to produce the third voltage in a secondary winding of the isolating transformer, wherein said secondary winding is included in said means for feeding back, and wherein said secondary winding of the isolating transformer is coupled to said first terminal and said second terminal via a serially connected said means for producing an effective negative capacitance and/or resistance.

10. A bidirectional equalizer arrangement as claimed in claim 9, further comprising:

means for rolling off feedback gain above a predetermined frequency band.

* * * * *